US005790101A

United States Patent [19]

Schoch et al.

[11] Patent Number: 5,790,101

[45] Date of Patent: Aug. 4, 1998

[54] ERGONOMIC CONTROL APPARATUS

[76] Inventors: Paul T. Schoch; Marvin G. Schoch, both of 1002 Rainbow Crest, Fallbrook, Calif. 92028

[21] Appl. No.: 804,803

[22] Filed: Feb. 24, 1997

Related U.S. Application Data

[63] Continuation-in-part of Ser. No. 650,345, May 20, 1996, Pat. No. 5,684,512.

[51] Int. Cl.$^6$ .................... G01D 15/06

[52] U.S. Cl. .................... 345/161; 345/168; 345/184; 74/471 XY

[58] Field of Search .................... 345/161, 168, 345/184; 341/20, 21, 22; 74/471 XY

[56] References Cited

U.S. PATENT DOCUMENTS

| | | | |
|---|---|---|---|
| 4,879,556 | 11/1989 | Duimel | 341/20 |
| 5,252,821 | 10/1993 | Sugimura | 250/22 |
| 5,261,291 | 11/1993 | Schoch et al. | 74/484 R |
| 5,510,810 | 4/1996 | Nishijima et al. | 345/156 |
| 5,589,828 | 12/1996 | Armstrong | 341/20 |
| 5,607,158 | 3/1997 | Chan | 273/148 B |

*Primary Examiner*—Thomas J. Mullen, Jr.
*Assistant Examiner*—Ashok Mannava
*Attorney, Agent, or Firm*—Drummond & Duckworth

[57] ABSTRACT

An ergonomic control apparatus is provided for producing signals in response to human feedback to control aircraft, land vehicles, computers, video games and the like. The ergonomic control apparatus includes a control stick interconnected to a slidable attachment means, pivotal attachment means and rotatable collar. The slidable attachment means includes first and second signal means for producing first and second signals in response to forward and rearward movement of the control stick from a neutral stick position. The pivotal attachment means includes third and fourth signal means for producing third and fourth sets of signals in response to forward and rearward inclination of the control stick. The rotatable collar may be manually rotated about the longitudinal axis of the control stick in both clockwise and counter-clockwise directions from a neutral collar position. Clockwise rotation of the rotatable collar from the neutral collar position produces a fifth set of signals while counter-clockwise rotation of the rotatable collar from the neutral collar position produces a sixth set of signals. Mounted on the upper end of the control stick is a removable handle. The removable handle further includes one or more actuators such as control buttons.

1 Claim, 7 Drawing Sheets

ERGONOMIC CONTROL APPARATUS

This application is a continuation-in-part application of copending U.S. application Ser. No. 08/650,345, filed May 20, 1996, now U.S. Pat. No. 5,684,512.

BACKGROUND OF THE INVENTION

This invention relates generally to ergonomic control apparatus, and more particularly, to a novel control stick for imparting a human sensory feedback to control multiple functions.

Hand operated controls have many useful applications, namely in aircraft, land vehicles, heavy equipment, computers and video games. The common terms for two such single handed control devices include computer "mouse" and "joystick".

A mouse is a device including a housing and a spherical ball on its underside. In operation, the mouse's underside is place against a hard surface such that movement imparted to the mouse causes the spherical ball to rotate. This rotation is translated into electrical signals which are then transmitted to a computer.

Meanwhile, a typical joystick includes a shaft capable of inclination from the vertical axis. Historically, the joystick was mechanically linked directly to the control surfaces through a series of levers, cables, rods, pulleys, etc. However, the advent of faster, larger and more sophisticated devices created a need for more precise control.

This need created the system known as "fly by wire" used for aircraft control. As the name implies, the joystick or control column serves as the actuator which sends electrical signals to the various hydraulic and/or electrical systems located throughout the aircraft. These systems, in turn, move the selected control surfaces in response to movements of the joystick. Operating in similar fashion is the computer joystick. The shaft of the computer joystick includes multiple electrical contacts which are configured to engage other contacts disposed in a joystick housing. By hand manipulation of the joystick shaft, the operator selectively causes the completion of different electrical circuits which in turn transmits signals to the computer.

Unfortunately, the prior art control devices suffer from several drawbacks. For example, the typical joystick transmits a minimum of signals. Signals are created due to forward, rearward, left and right inclination of the joy stick and combinations thereof Unfortunately, there are numerous applications where the typical joystick does not transmit sufficient signals to provide sufficient control and a user must then use his feet or other hand to provide additional human sensory feedback. To this end, joysticks have been devised which include buttons on the stick's upper extremity or on the joystick's housing. Unfortunately, these buttons are merely on-off switches which do not provide sufficient sensitivity required in some applications.

Additionally, devices are known where the human operator imparts rotation to provide human sensory feedback. These devices are generally in the form of a steering wheel or a miniaturized steering wheel. Unfortunately, such devices make no provision for controlling functions which are most easily controlled by forward and rearward inclination of a control stick.

An additional example of a control apparatus in the prior art is disclosed in U.S. Pat. No. 4,748,441 issued to Berzinski. This reference discloses a multiple function control member which includes a first joystick disposed on the upper extremity of a second joystick. Unfortunately, neither joystick is capable of transmitting signals by rotation of a control member. Further, U.S. Pat. No. 5,261,291, which issued to the inventors of the present invention and is incorporated by reference herein, discloses a device including a rotatable collar for transmitting signals representative of rotation and a shaft capable of inclination from the vertical axis for transmitting signals representative of forward and rearward movement. Unfortunately, even this device does not provide sufficient human sensory feedback to control some devices by use of a single hand.

The prior art ergonomic control devices also suffer from the additional drawback that they do not allow for the use of different handles. Accordingly, joysticks for the right hand cannot be comfortably used with the left hand, and vice versa. Similarly, prior art joysticks do not provide interchangeable hand grips to be used for different applications. For example, it would be advantageous to use a single control stick which is capable of being used as a single vertically extending joystick and also as a circular control wheel.

Accordingly, it is an object of the present invention to provide a single unit ergonomic control apparatus capable of multiple function operational control.

Another object of the present invention is to provide a single unit ergonomic control apparatus which is capable of interchanging handles, hand grips and the like.

These and other objects of the present invention will be understood by those in the art by referring to the following description in conjunction with accompanying drawings.

SUMMARY OF THE INVENTION

The present invention is an ergonomic control apparatus for producing signals in response to human feedback to control many useful applications including aircraft, land vehicles, computers and video games. The ergonomic control apparatus includes a control stick extending substantially vertical from a base. The apparatus further includes a pivotal attachment means and a slidable attachment means for attaching the lower extremity of the control stick to the base. In operation, the control stick is restricted to movement both forward and rearward of a neutral stick position and both forward and rearward inclination from the control stick's at rest substantially vertical position. The terms forward and rearward are used for convenience. It being understood by those in the art that the device can rotated for movement of the stick in the left and right directions and in left and right inclinations from the vertical axis.

The slidable attachment means further includes a first signal means and a second signal means. The first signal means is interconnected with the control stick such that movement of the control stick forward from the neutral stick position produces a first set of control signals. Similarly, the second signal means is interconnected with the control stick such that movement of the stick rearward from the neutral stick position produces a second set of control signals.

In like manner, the pivotal attachment means further includes a third signal means and a fourth signal means. The third signal means is interconnected with the control stick such that forward inclination of the control stick from the substantially vertical axis produces a third set of control signals. The fourth signal means is also interconnected to the control stick such that rearward inclination of the control stick from the substantially vertical axis produces a fourth set of control signals.

Affixed to the lower extremity of the control stick is a rotatable collar. The rotatable collar is annularly disposed on the outer surface of the control stick such that the collar may be manually rotated about the longitudinal axis of the stick in both clockwise and counter-clockwise directions from a neutral collar position. Clockwise rotation of the collar away from the neutral collar position causes a fifth set of control signals to be produced. Similarly, counter-clockwise rotation of the collar away from the neutral collar position cause a sixth set of signals to be produced. These six sets of signals are transmitted by mechanical linkages, hydraulic systems, optical systems and/or electrical systems to control the human operated systems sought to be controlled such as vehicles, heavy equipment, aircraft, computers or video games.

In a preferred embodiment, the ergonomic control apparatus includes a removable handle for selective engagement and disengagement to the control stick. The removable handle further includes one or more control buttons for producing signals actuated by a person's finger pressing on the one or more buttons. Interconnected to the buttons are a corresponding number of button contacts which are configured to engage shaft contacts formed on the upper extremity of the control stick. In operation, depression of the one or more buttons on the releaseable handle opens or closes an electrical circuit thereby producing button signals which are transmitted through the control stick.

Due to the releasable feature of the handle, additional handles can be substituted to provide a control stick capable of multiple functions. For example, a handle configured for a right handed person can be substituted for a handle suitable for a left handed person. Additionally, the releasable handle can be substituted subject to the user's desire for control sticks of different configurations. For example, a simple vertically extending stick can be substituted for a control apparatus similar to a steering wheel. Further, the releasable handle may be of different sizes, lengths, materials or weight, subject to the user's needs.

In an additional preferred embodiment, a console is mounted on the upper extremity of the control stick. The console has a control panel formed with the one or more actuator positioned for finger actuation such that a single hand can provide manual control of the control stick, the rotatable collar and the control panel. As would be understood by those in the art, the control panel may include any number of actuation means including switches, push buttons, rotatable knobs, etc. Furthermore, the console may include status indicators for providing status of the functions sought to be controlled. For example, the control stick configured for operation of an aircraft could include typical aircraft status indicators including elevation, air speed, fuel level, etc.

The present invention combines numerous control functions on a single control handle which is ergonomically designed to allow easy manipulation with a single hand. Further, the present invention can be used with a combination of electrical, hydraulic, or mechanical linkages to various control actuators for accurate control of numerous useful applications, thereby allowing flexibility in design. Other features and advantages of the present invention will become apparent from the following more detailed description, taken in conjunction with the accompanying drawings, which illustrate by way of example, the principles of the invention.

BRIEF DESCRIPTION OF THE DRAWINGS

The accompanying drawings illustrate the invention. In such drawings.

5

DETAILED DESCRIPTION OF THE INVENTION

Figure 1:
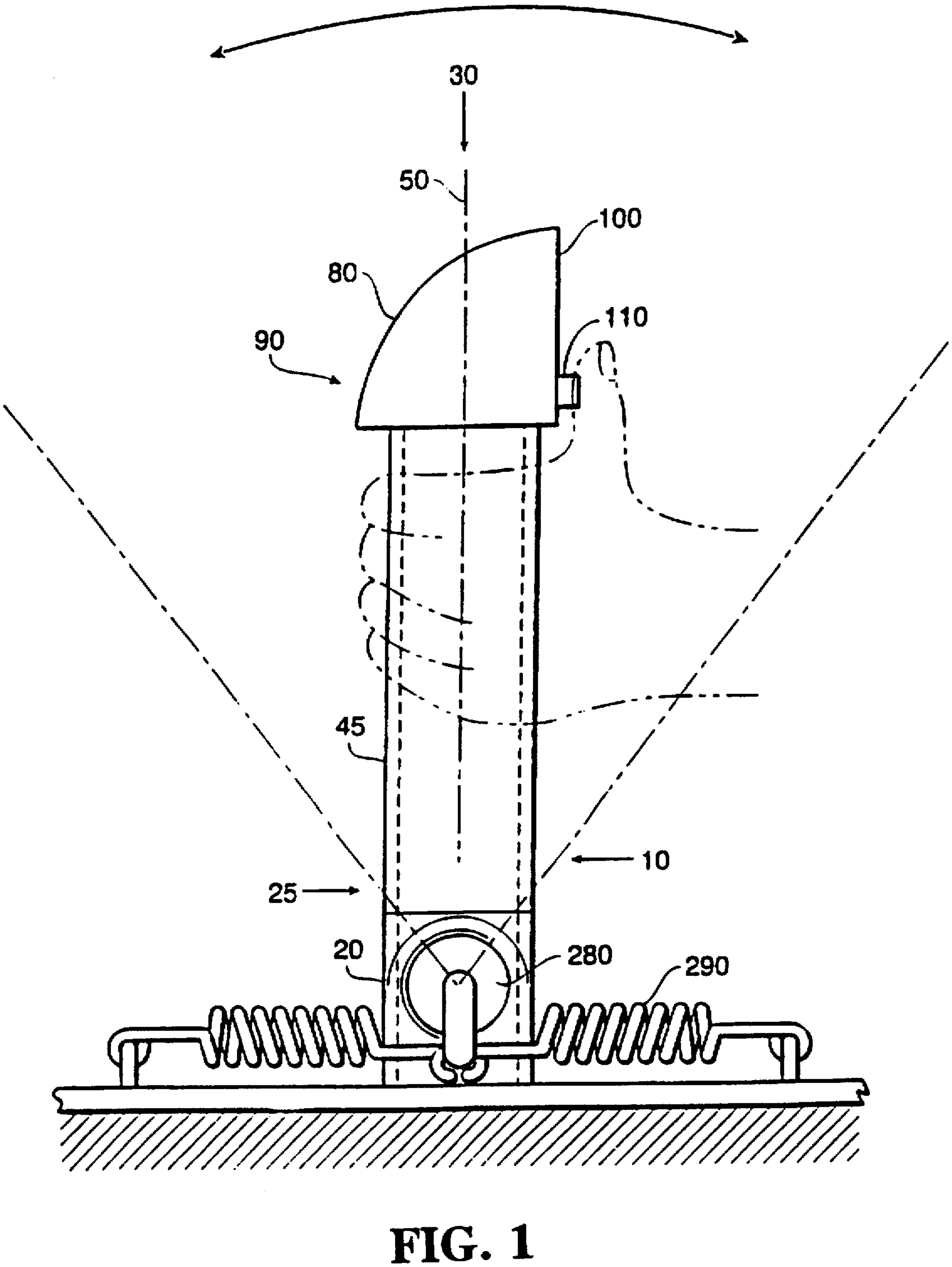
FIG. 1 is a right side elevational view of the invention illustrating the pivotal attachment means of the control stick, with a hand in phantom outline grasping the control stick.
Figure 2:
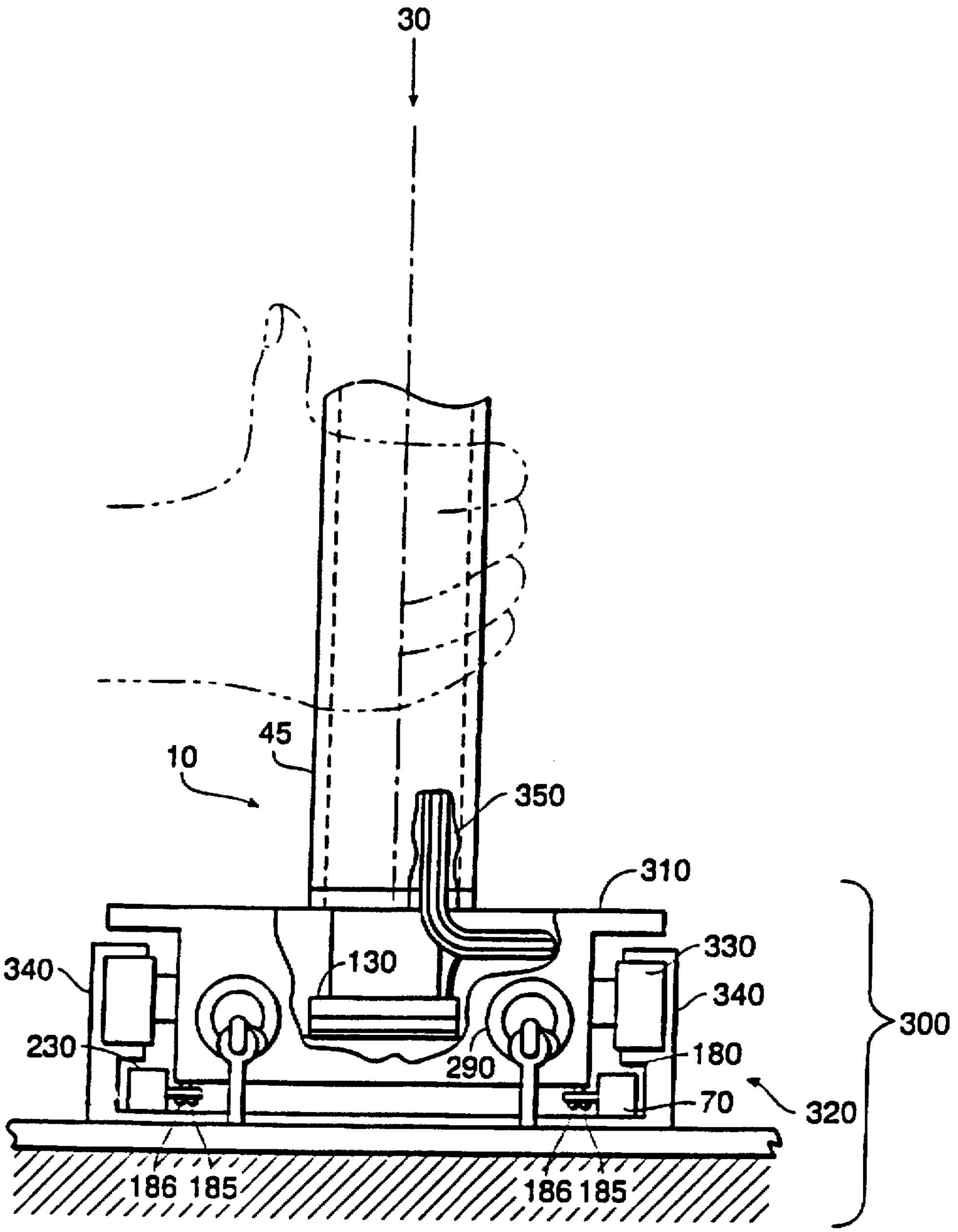
FIG. 2 is a front elevational view of the invention illustrating the slidable attachment means of the control stick.
Figure 3:
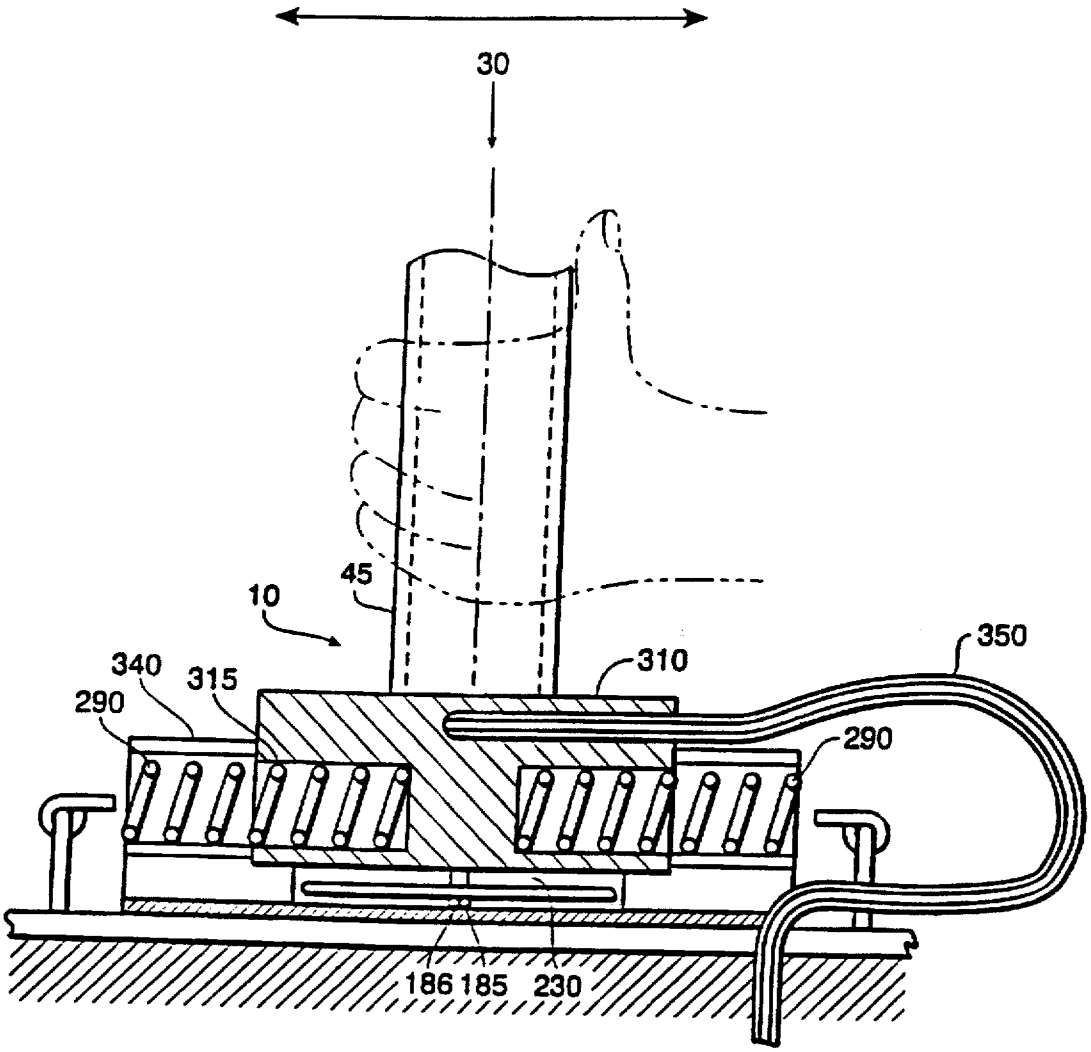
FIG. 3 is a cross-sectional view illustrating the urging means of the slidable attachment means urging the control stick into a neutral stick position.

FIGS. 1–3 show a simplified ergonomic control apparatus of the present invention. As shown in FIG. 1, the ergonomic control apparatus includes a vertical control stick 10 and a pivotal attachment 20 attached to the lower end 25 of the control stick 10. The pivotal attachment 20 includes a horizontally oriented pivot pin 280 for pivotal rotation of the control stick. In a preferred embodiment, the stick 10 is restricted to inclination along the line of direction of both forward and rearward of a neutral stick position 30. The terms "forward" and "rearward" are used herein for convenience, it being understood by those in the art that the device can be rotated in its entirety, for movement of the control stick in the left and right directions. Preferably, the apparatus further includes an urging means 290 for urging the stick 10 towards the neutral stick position 30. The urging means 290 may be a pair of springs, as illustrated in FIG. 1, or may be any other suitable urging means. The stick 10 is preferably manufactured from a rigid material, such as a plastic or metal alloy. As would be understood by those in the art, the apparatus may also be manufactured from a combination of rigid and semi-rigid materials.

As illustrated in FIGS. 2 and 3, the ergonomic control apparatus further includes a slidable attachment means 300 for slidable attachment of the pivotal attachment means (not shown) to a fixed surface. Preferably, the slidable attachment means 300 includes a carrier assembly 310. The carrier assembly is affixed to the lower end of the control stick 10, and includes a track assembly 320, which is, in turn, affixed to the fixed surface. The carrier assembly 310 further includes bearing means 330 positioned on opposing sides of the carrier assembly 310, that slidably engage a pair of opposing tracks 340 formed on the track assembly 320. In a preferred embodiment of the slidable attachment means, a flexible conduit 350 is also included. One end of the flexible conduit is attached to the carrier assembly 310 while the other end of the flexible conduit is attached to the fixed surface. The flexible conduit 350 allows the carrier assembly 310 to move freely along the track assembly 320 and may contain wires, control cables and the like. Maintaining the control stick in a neutral position is a second urging means 290 comprising two opposing pairs of springs formed in corresponding carrier cavities 315. Again, preferably the slidable attachment means 300 is manufactured from a rigid material with bearing means 330 and tracks 340 being constructed of conventional type well known to those in the art.

Figure 4:
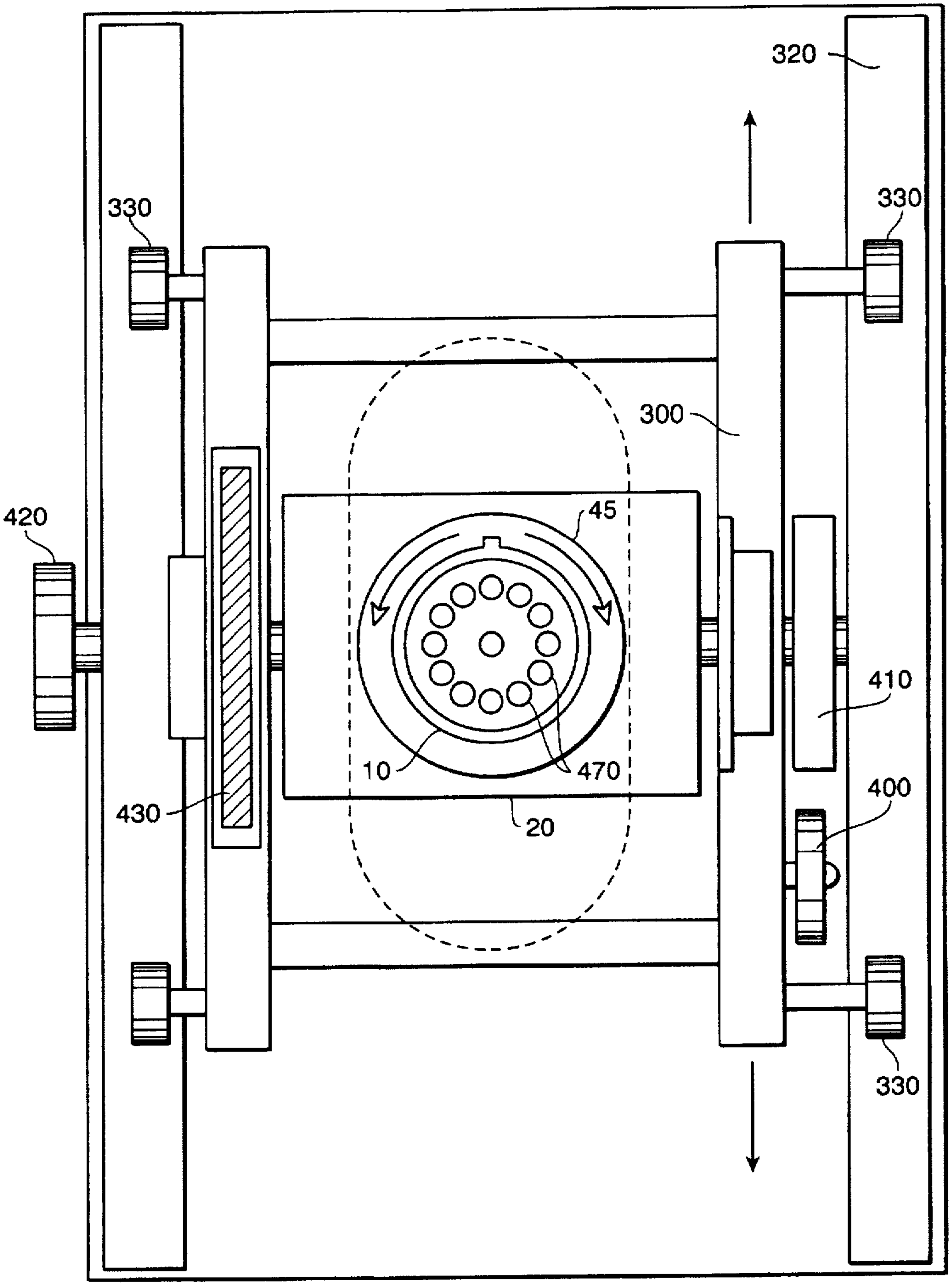
FIG. 4 is a top elevational view of the invention illustrating the slidable attachment means, pivotal attachment means and rotatable collar.
Figure 5:
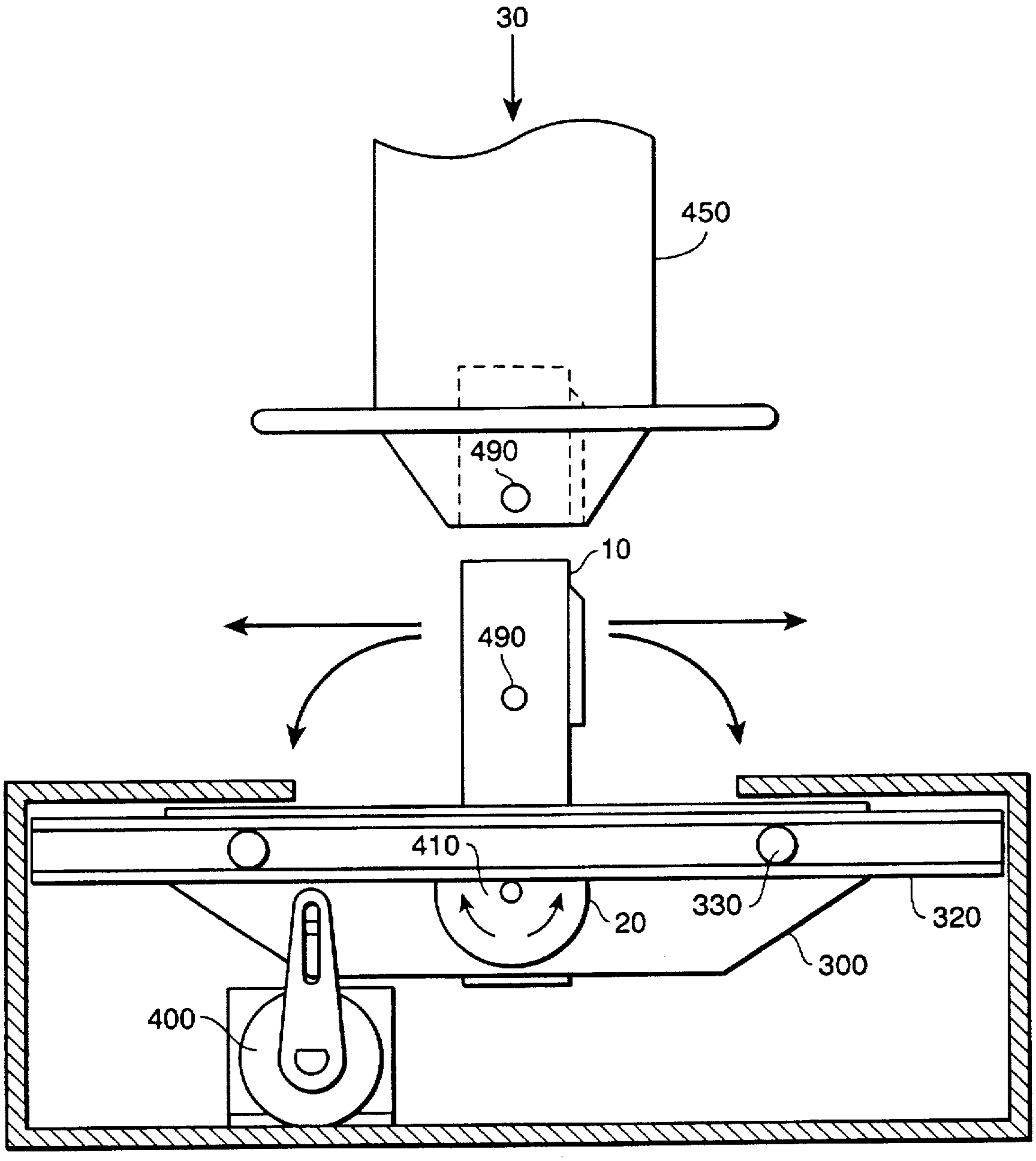
FIG. 5 is a cross-sectional view illustrating the slidable attachment means, pivotal attachment means and releasable handle of the invention.

A preferred embodiment of the ergonomic control apparatus of the present invention showing both the pivotal attachment means and slidable attachment means is shown in FIGS. 4 and 5. The slidable attachment means further includes first and second signal means. The first signal means is interconnected with the control stick 10 such that movement of the control stick forward from the neutral stick position produces a first set of signals. Similarly, a second signal means is interconnected with the control stick 10 such that movement of the control stick rearward from the neutral stick position produces a second set of signals. As shown in FIG. 2, the first and second signal means are potentiometer transducers 190 and 230. In a second embodiment, the first and second signal means are combined in a single potentiometer transducer 400 (FIG. 4). In a preferred embodiment, the first and second signal means produce an electrical voltage in proportion to movement of the stick from the neutral stick position.

As shown in FIG. 4, the slidable attachment means 300 further includes a slide tension adjuster 420. The slide tension adjuster is a rotatable knob in which rotation either increases or decreases the amount of force imparted on the control stick necessary to effect forward or rearward movement. The slide tension adjuster may also be in numerous configurations capable of being determined by those skilled in the art. For example, the slidable tension adjuster may be configured as a threaded screw engaging the track assembly 320. Rotation of the slidable tension adjuster 420 will thereby increase or decrease friction of the slidable adjustment means as it is moved forward or rearward on the fixed surface. In another embodiment, the slide tension adjuster engages the urging means 290 (FIG. 3). Rotation of the slide adjuster 420 selectively imparts or releases compression of the springs to thereby increase or decrease the amount of force necessary to move the control stick forward and rearward.

With reference to FIGS. 1, 4 and 5, the pivotal attachment means includes a third signal means and fourth signal means interconnected with the control stick 10. Inclination of the control stick in the forward direction from the neutral stick position 30 causes the pivotal attachment means to produce a third set of signals. Similarly, inclination of the control stick 10 rearward from the neutral stick position 30 causes the attachment means to produce a fourth set of signals. As shown in FIG. 4, in a preferred embodiment, the third and fourth signal means are combined in a single round potentiometer 410. In operation, inclination of the control stick in the forward or rearward direction preferably causes the potentiometer 410 to produce an electrical voltage in proportion to the angle of the control stick from the neutral stick position. Further, the pivotal attachment means includes an inclination force adjuster 430. In similar manner to the slide tension adjuster, rotation of the force inclination adjuster selectively increases the force necessary to manually incline the control stick forwardly and rearwardly.

A rotatable collar 45 is annularly affixed to the control stick 10 such that collar 45 may be manually rotated about the longitudinal axis 50 of the control stick 10 in both clockwise and counter-clockwise directions. Preferably, the apparatus includes an additional urging means for preferentially holding the rotatable collar 45 at a neutral collar position and for urging the rotatable collar back to the neutral collar position when rotated otherwise. In a first embodiment, the collar urging means is comprised of two springs mounted in opposite arcs with each spring being mounted at one end to the collar 45 and the other end to the pivot attachment means 20. Other means for maintaining the rotatable collar at the neutral collar position may be devised by those in the art without undue experimentation.

In operation, clockwise rotation of the rotatable collar away from the neutral collar position causes the rotatable collar to produce a fifth set of control signals. Similarly, counter-clockwise rotation of the rotatable collar away from the neutral collar position causes the rotatable collar to produce a sixth set of signals. Preferably, the fifth and sixth set of signals are electrical signals with the voltage being proportional to the magnitude of rotation of the collar away from the neutral collar position. Alternate embodiments of the invention cause the rotatable collar to produce voltages of the fifth and sixth sets of signals to be nonlinear with respect to the magnitude of rotation of the rotatable collar away from the neutral collar position.

Figure 6A:
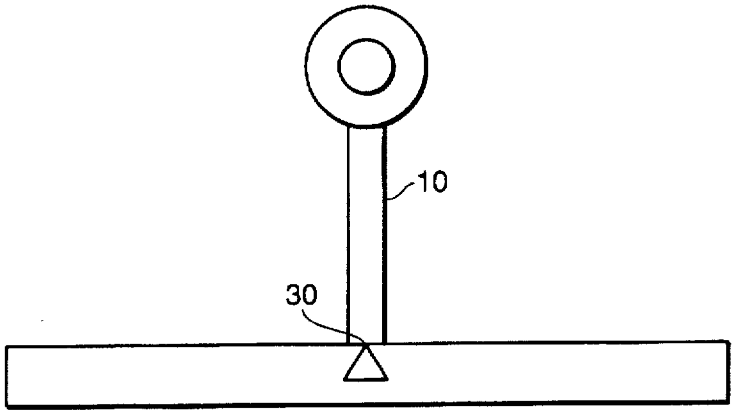
FIGS. 6A–D is a side view of the invention illustrating the multiple function operation of the control stick.
Figure 6B:
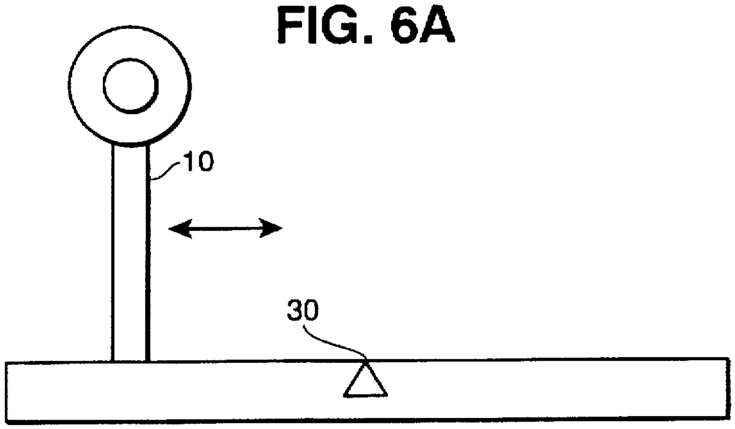
Figure 6C:
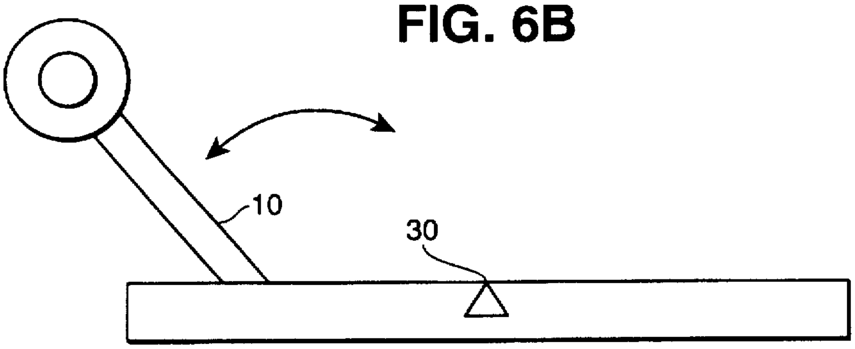
Figure 6D:
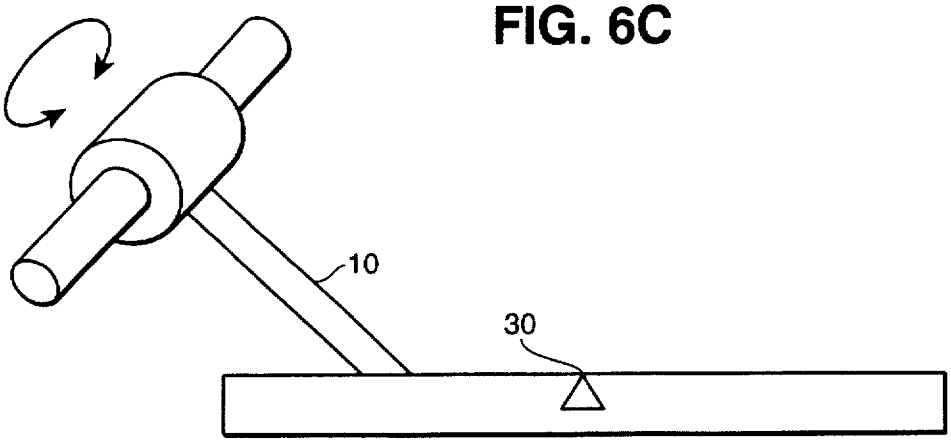

Referring to FIGS. 6A–D, the ergonomic control apparatus includes a multifunction control stick. FIG. 6A shows a side view of the control stick in the neutral stick position. Movement of the control stick in the forward of rearward direction produces a first or second set of signals, respectively (FIG. 6B). Similarly, inclination of the control stick forwardly or rearwardly produces a third or fourth set of signals (FIG. 6C). Furthermore, the control stick may be rotated about the longitudinal axis of the control stick in the clockwise or counter-clockwise directions to produce fifth or sixth sets of signals (FIG. 6D). Again, it is understood by those skilled in the art, these signals may be transmitted by mechanical, hydraulic, optical, electrical systems, etc.

Figure 7A:
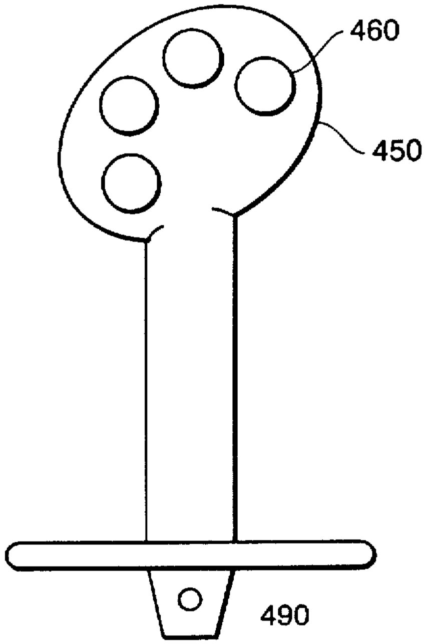
FIGS. 7A and B are rear views of the releasable handle of the present invention configured as right and left handed joysticks.
Figure 8A:
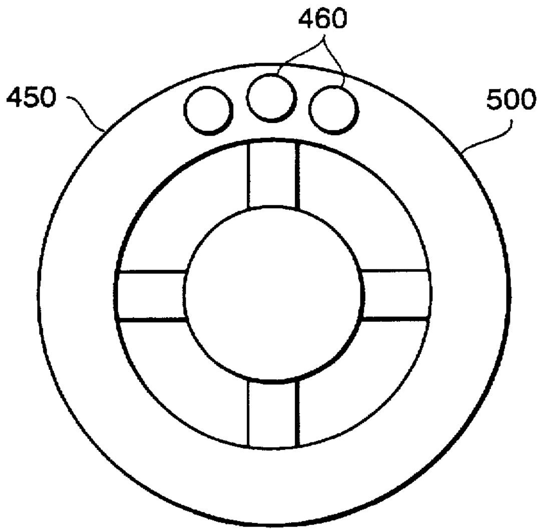
FIGS. 8A and B are top and side cross-sectional views of the releasable handle of the present invention configured as a steering wheel.

In an additional embodiment, the ergonomic control apparatus of the present invention includes a removable handle for selective engagement and disengagement to the control stick. The removable handle may take numerous forms such as a knob or console, including one or more actuators. The actuators may include switches, push buttons, rotatable knobs, etc. Furthermore, the console may include status indicators for providing information regarding the functions sought to be controlled. As shown in FIGS. 7A and B, the actuators of the removable handle 450 are configured as a plurality of push buttons 460. The push buttons 460 are actuated by a person's finger depressing the one or more buttons. As shown in FIG. 8A and B, the removable handle may be configured similar to a steering wheel 500 also including push buttons 460. Interconnected to the push buttons are a corresponding number of button contacts 480 which are configured to engage shaft contacts 470 formed at the upper extremity of the control stick (FIG. 4). In operation, depression of one or more buttons on the releasable handle selectively opens or closes a circuit thereby producing button signals which are transmitted through the control stick 10.

An additional feature of the present invention is a handle lock 490. Human control of a control stick often imparts great stresses to the control stick during manipulation. In order to eliminate the possibility of the releasable handle from inadvertent disengagement from the control stick, the present invention includes handle lock 490. The handle lock may be in any of numerous forms, known to those skilled in the art, such as a press fit, a clasp, a bore with corresponding lock pin, etc. In a preferred embodiment of the handle lock, the control stick includes a depressable button configured to be telescopically received within an indent formed in the handle.

Figure 7B:
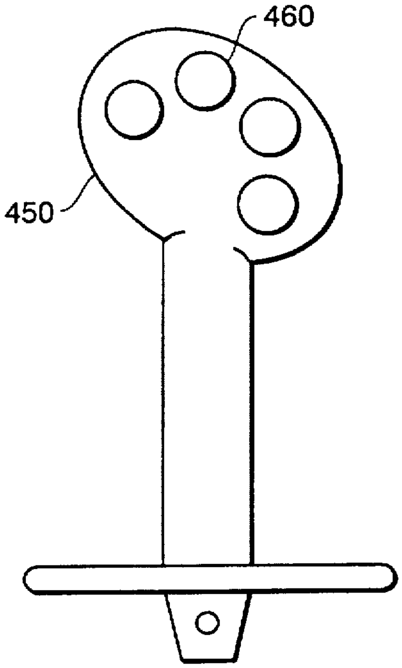
Figure 8B:
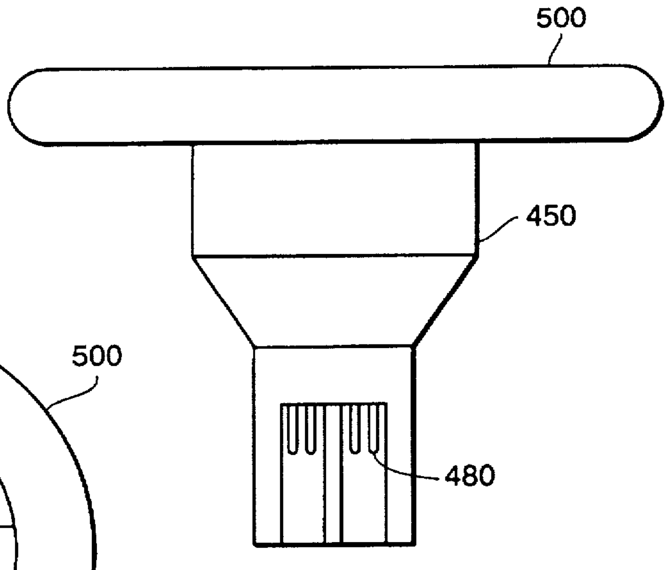

It is an object of the present invention that due to the releasable feature of the handle, substitute handles having different functions may be substituted on the control stick. For example, FIGS. 7A and B show handles configured for use by the right hand and by the left hand, respectively. Meanwhile, the vertical control stick of FIG. 7 may be substituted with the steering wheel of FIG. 8. Further, the releasable handles may be of different sizes, lengths, materials or weight, subject to the desires of the user.

While the invention has been described with reference to several preferred embodiments, it is clearly understood by those skilled in the art that the invention is not limited thereto. Thus, the scope of the invention is to be interpreted only in conjunction with the appended claims.

We claim:

1. An ergonomic control apparatus including a neutral stick position defined by a substantially vertical axis comprising:

a) a base;

b) a control stick connected to said base;

c) a slidable attachment means for slidably interconnecting said control stick to said base, said slidable attachment means further including, 1) a first signal means being connected to said control stick such that movement of said control stick in a forward direction causes said first signal means to produce a first set of signals, 2) a second signal means being connected to said control stick such that movement of said control stick in a rearward direction causes said second signal means to produce a second set of signals;

d) a pivotal attachments means for pivotally interconnecting said control stick to said base, said pivotal attachment means including, 1) a third signal means being connected to said control stick such that forward inclination of said control stick causes said third signal means to produce a third set of signals, 2) a fourth signal means being connected to said control stick such that rearward inclination of said control stick causes said fourth signal means to produce a fourth set of signals; and e) a rotatable collar connected to said control stick such that rotation of said rotatable collar about said vertical axis in the clockwise direction produces a fifth set of signals, and said rotatable collar being further configured such that rotation of said rotatable collar about said vertical axis in the counter clockwise direction produces a sixth set of signals.

* * * * *